United States Patent [19]

Heinlen et al.

[11] Patent Number: 5,783,224
[45] Date of Patent: Jul. 21, 1998

[54] MOLD LAMINATE ASSEMBLY FOR AN INJECTION MOLD MACHINE

[75] Inventors: Frederick Jay Heinlen, Etters, Pa.; Louis vanderSanden, Hertogenbosch, Netherlands; Bruce Merrill Whitney, Southern Pines, N.C.

[73] Assignee: The Whitaker Corporation, Wilmington, Del.

[21] Appl. No.: 701,409

[22] Filed: Aug. 22, 1996

Related U.S. Application Data

[60] Provisional application No. 60/007,090 Oct. 31, 1995.

[51] Int. Cl.⁶ .................................................. B29C 45/33
[52] U.S. Cl. ...................... 425/192 R; 425/468; 425/577; 425/DIG. 30; 249/160; 249/164
[58] Field of Search .......................... 425/577, 192 R, 425/DIG. 30, 443, 468, 441; 249/160, 164, 165

[56] References Cited

U.S. PATENT DOCUMENTS

| | | | |
|---|---|---|---|
| 3,357,058 | 12/1967 | Kutik | 425/192 R |
| 3,564,660 | 2/1971 | Darnell | 425/577 |
| 3,756,553 | 9/1973 | Ranz | 249/142 |
| 3,807,928 | 4/1974 | Horberg, Jr. et al. | 425/387 B |
| 3,930,780 | 1/1976 | Lovejoy | 425/443 |
| 4,303,221 | 12/1981 | Galluser et al. | 249/102 |
| 4,330,248 | 5/1982 | Platte | 425/183 |
| 4,379,685 | 4/1983 | Tada et al. | 425/183 |
| 4,501,548 | 2/1985 | Jahnel | 425/183 |
| 4,550,006 | 10/1985 | Laghi | 425/183 |
| 4,815,960 | 3/1989 | Rudolph | 425/522 |
| 4,861,534 | 8/1989 | Boehm et al. | 264/102 |
| 4,975,041 | 12/1990 | Fries et al. | 425/547 |
| 5,217,728 | 6/1993 | Grabbe | 425/577 |
| 5,255,889 | 10/1993 | Collette et al. | 249/102 |
| 5,282,733 | 2/1994 | Noritake et al. | 425/183 |
| 5,445,511 | 8/1995 | Ito et al. | 425/183 |
| 5,565,221 | 10/1996 | Caroli | 425/190 |

FOREIGN PATENT DOCUMENTS

| | | |
|---|---|---|
| 0 414 615 A1 | 2/1991 | European Pat. Off. |
| 59 707 E | 7/1954 | France |
| 60-259420 | 12/1985 | Japan |
| 63-062332 | 3/1988 | Japan |
| 60 15 685 | 1/1994 | Japan |
| 2 233 596 | 1/1991 | United Kingdom |
| WO 95/08416 | 3/1995 | WIPO |

OTHER PUBLICATIONS

Patent Application Serial No. 08/455,481, Davis, Filed May 31, 1995, Abstract and drawings only.
Patent Application Serial No. 08/650,405, vanderSanden, Filed May 20, 1996, Abstract and drawings only.

*Primary Examiner*—Jay H. Woo
*Assistant Examiner*—Iurie A. Schwartz
*Attorney, Agent, or Firm*—Bradley N. Ditty

[57] ABSTRACT

A reconfigurable injection mold machine (10) having a fixed mold body (60, 60') and two movable mold bodies (62, 62' and 64, 64') that can be automatically repositioned with respect to each other to make different mold cavities for molding different parts. The three mold bodies (60,60', 62,62' and 64,64') each include a laminate subassembly (140,140', 142,142', 144,144') composed of a plurality of laminates (162,162', 164,164', 204,204', 234,234') and a mounting frame (146,146', 192,192', 218,218') arranged to hold and position the laminates during assembly to the mold. The mounting frame permits preassembly of the laminates on the workbench into a subassembly (140,140', 142,142', 144,144') that is then easily inserted into an opening in the mold (60,60', 62,62' and 64,64') and secured in place. Additionally, the mounting frame (146,146', 192,192', 218, 218') secures the laminates (162,162', 164,164', 204,204', 234,234') in their respective positions during reconfiguration of the movable mold bodies (62, 62' and 64, 64') and serves to maintain the laminate assemblies in proper alignment when in a non-active or idle position.

17 Claims, 17 Drawing Sheets

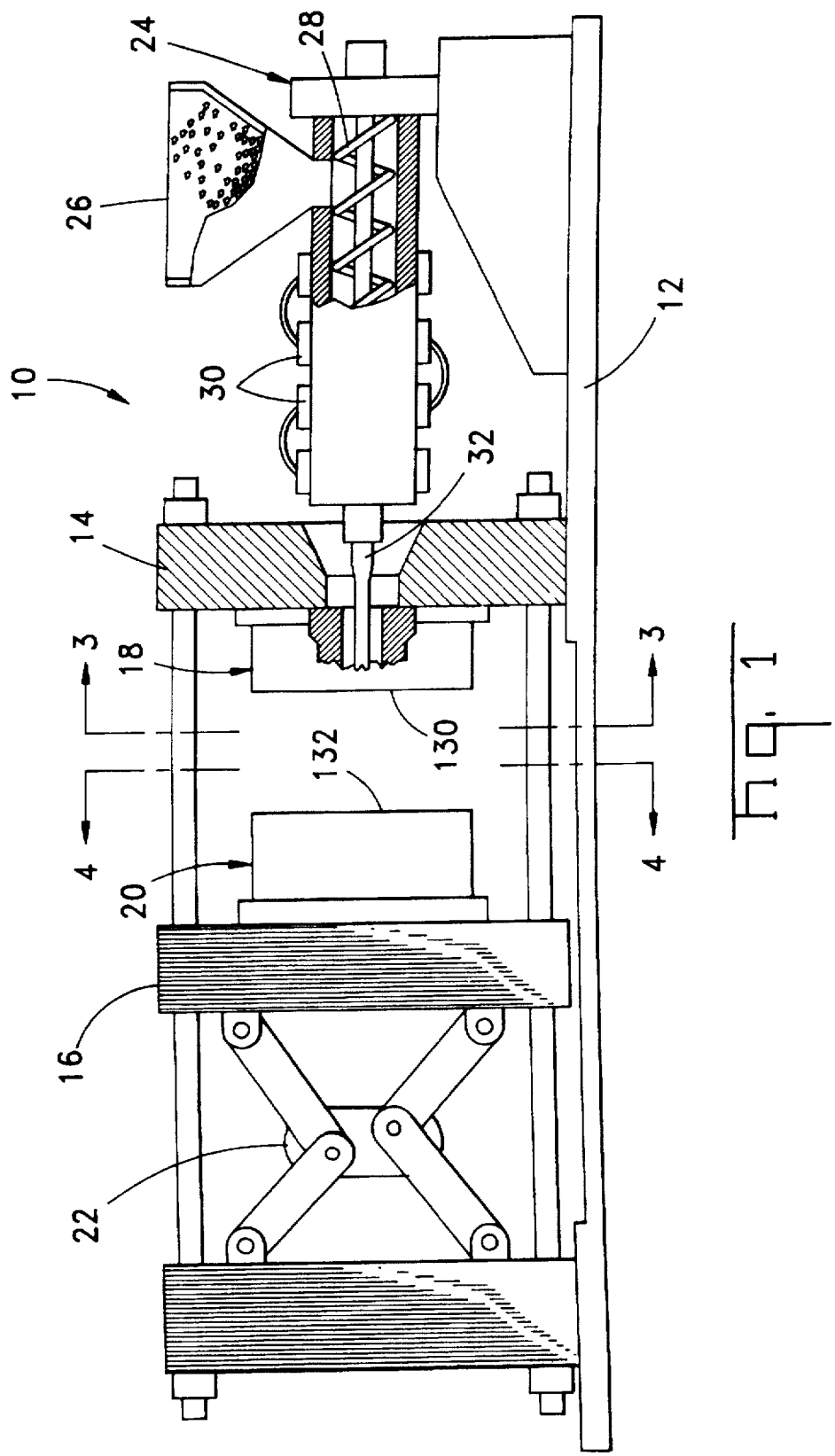

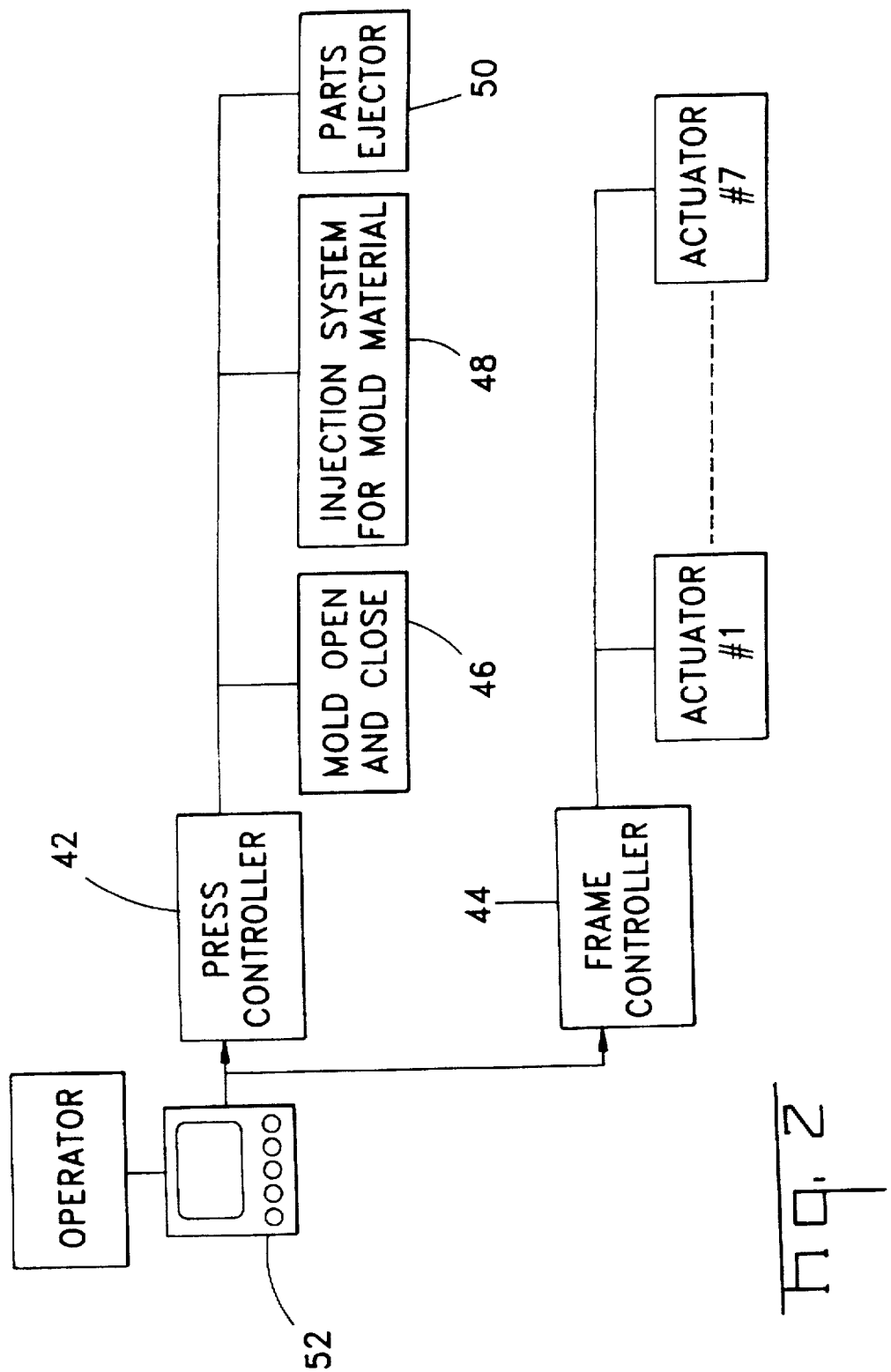

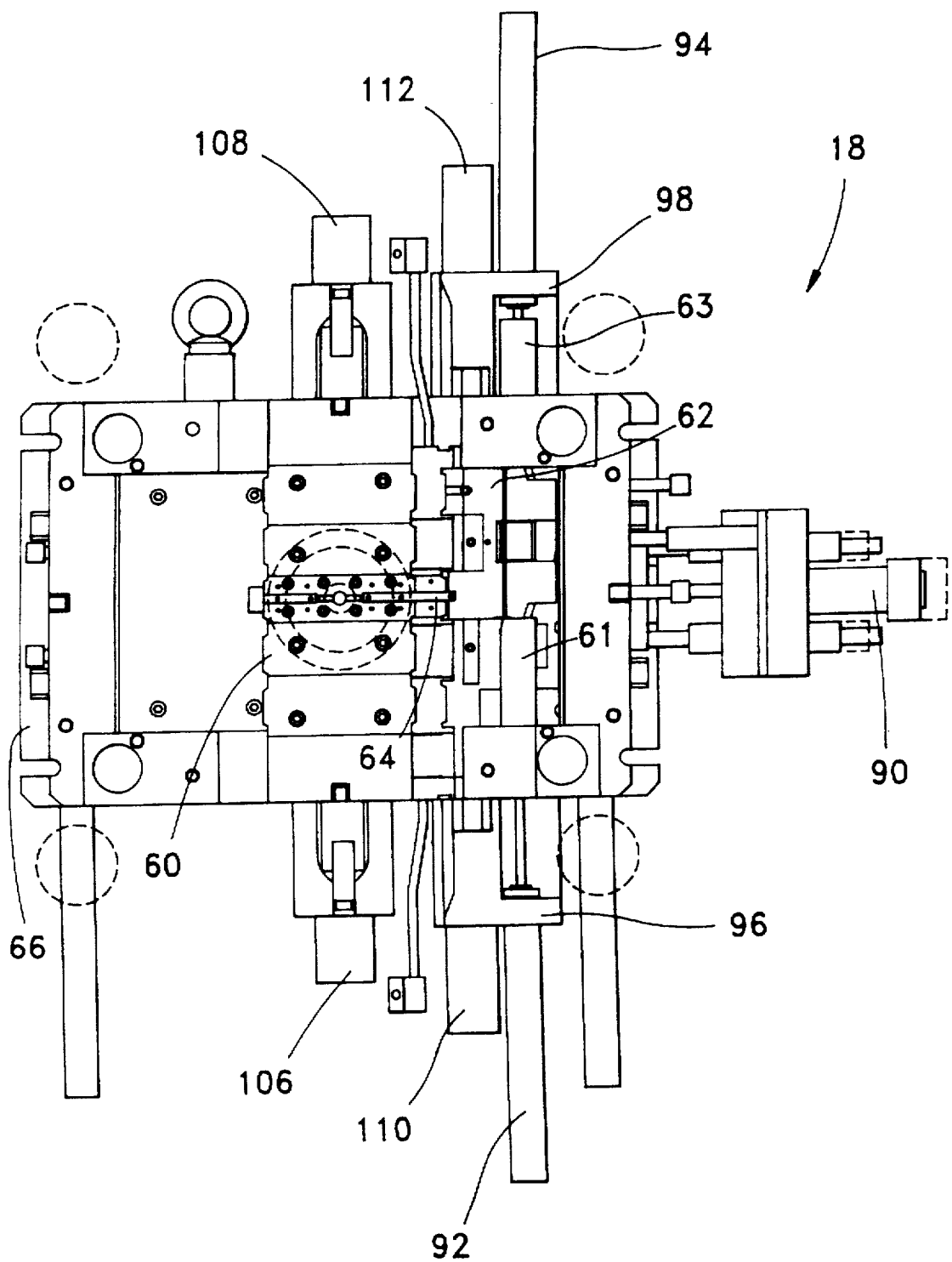
Fig. 3 (A-SIDE FRONT MOLD)

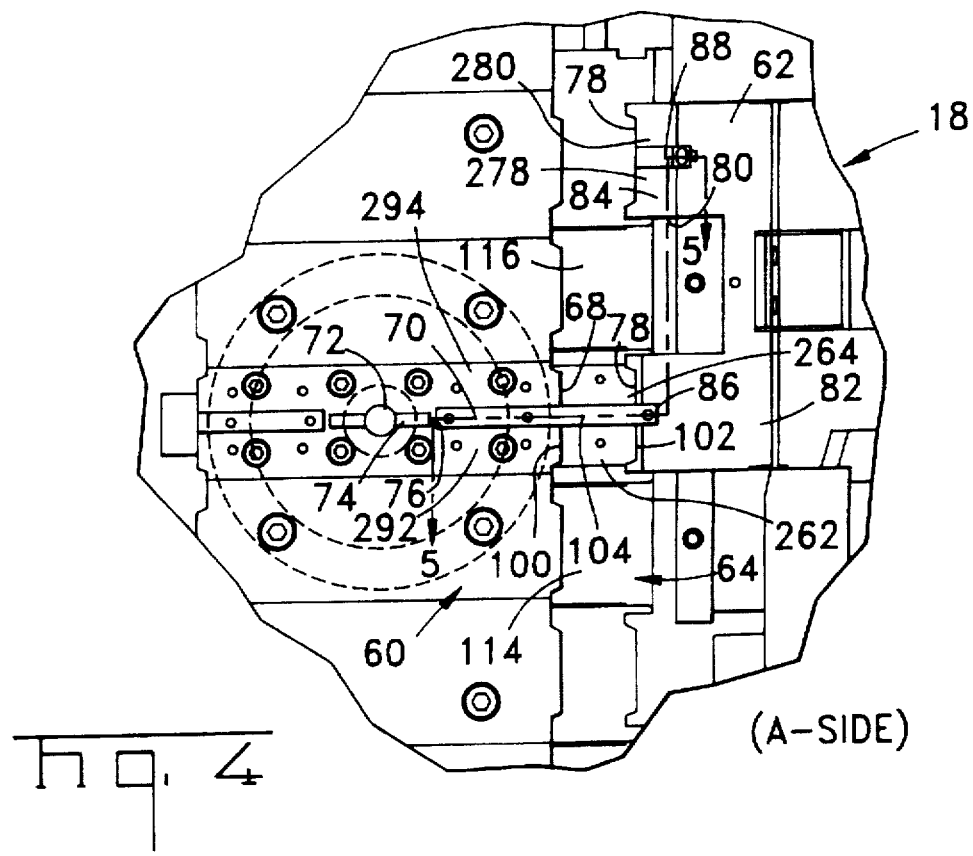
Fig. 4 (A-SIDE)
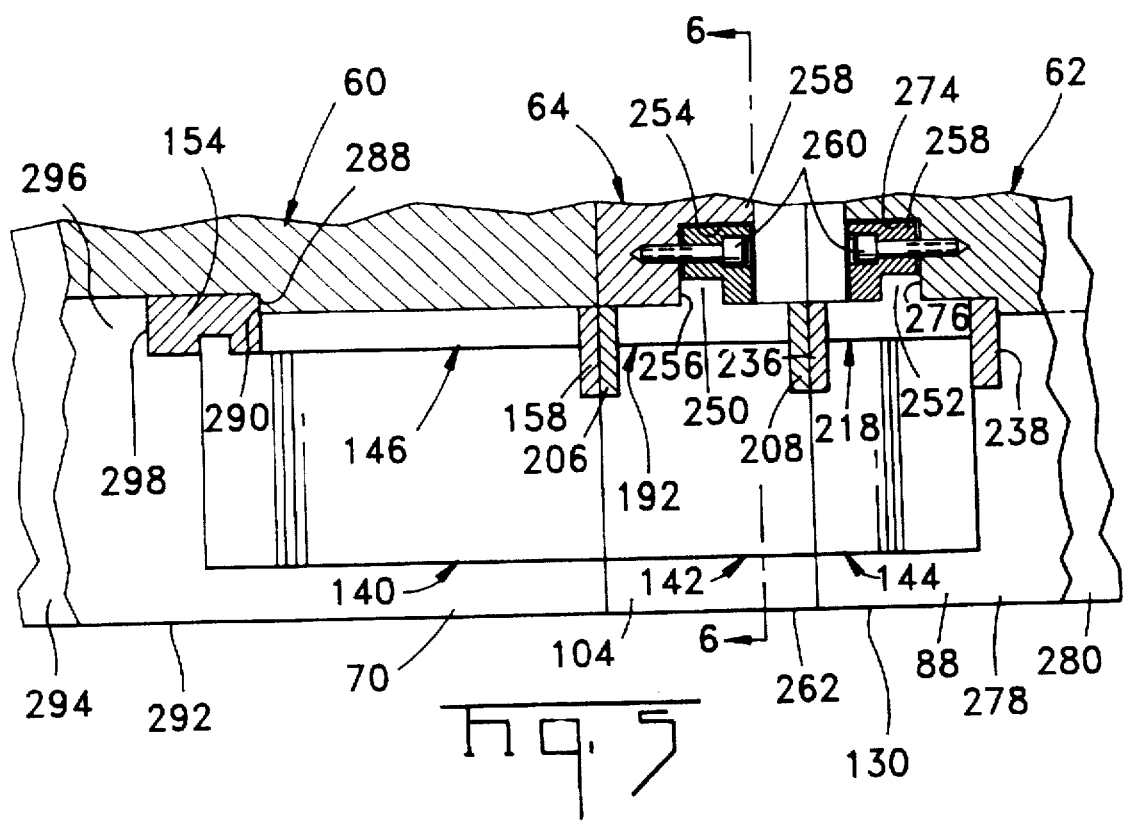
Fig. 5

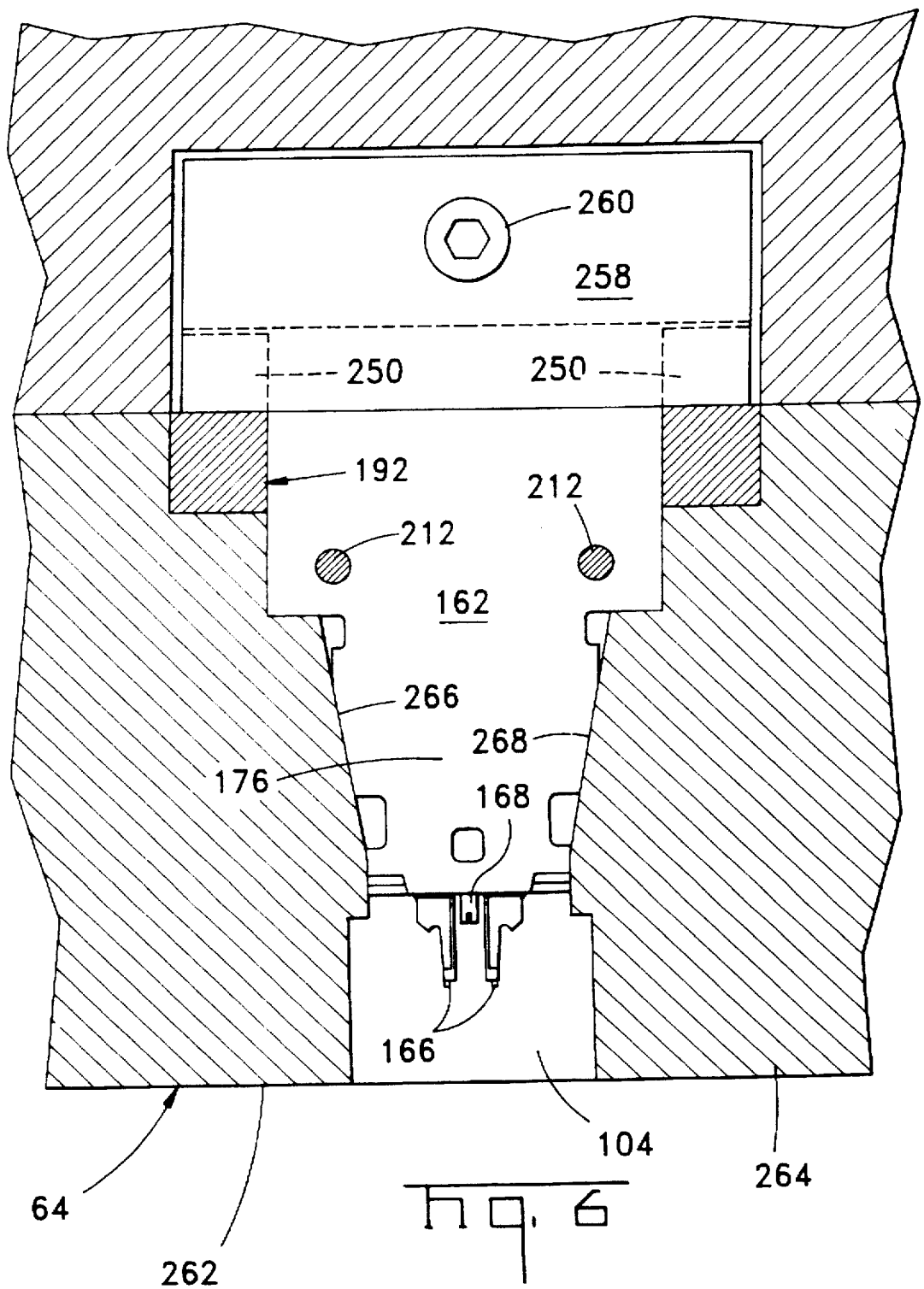

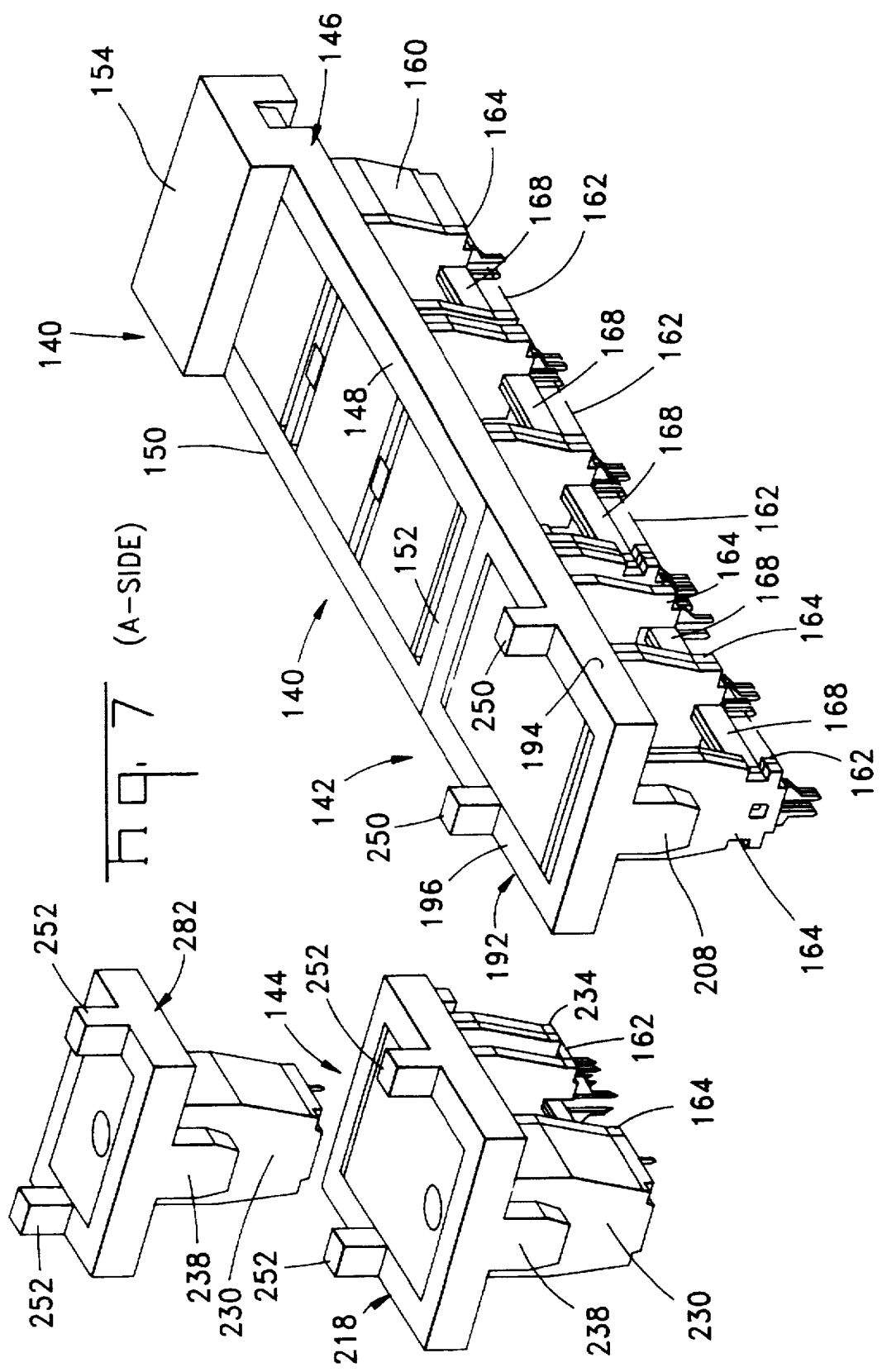

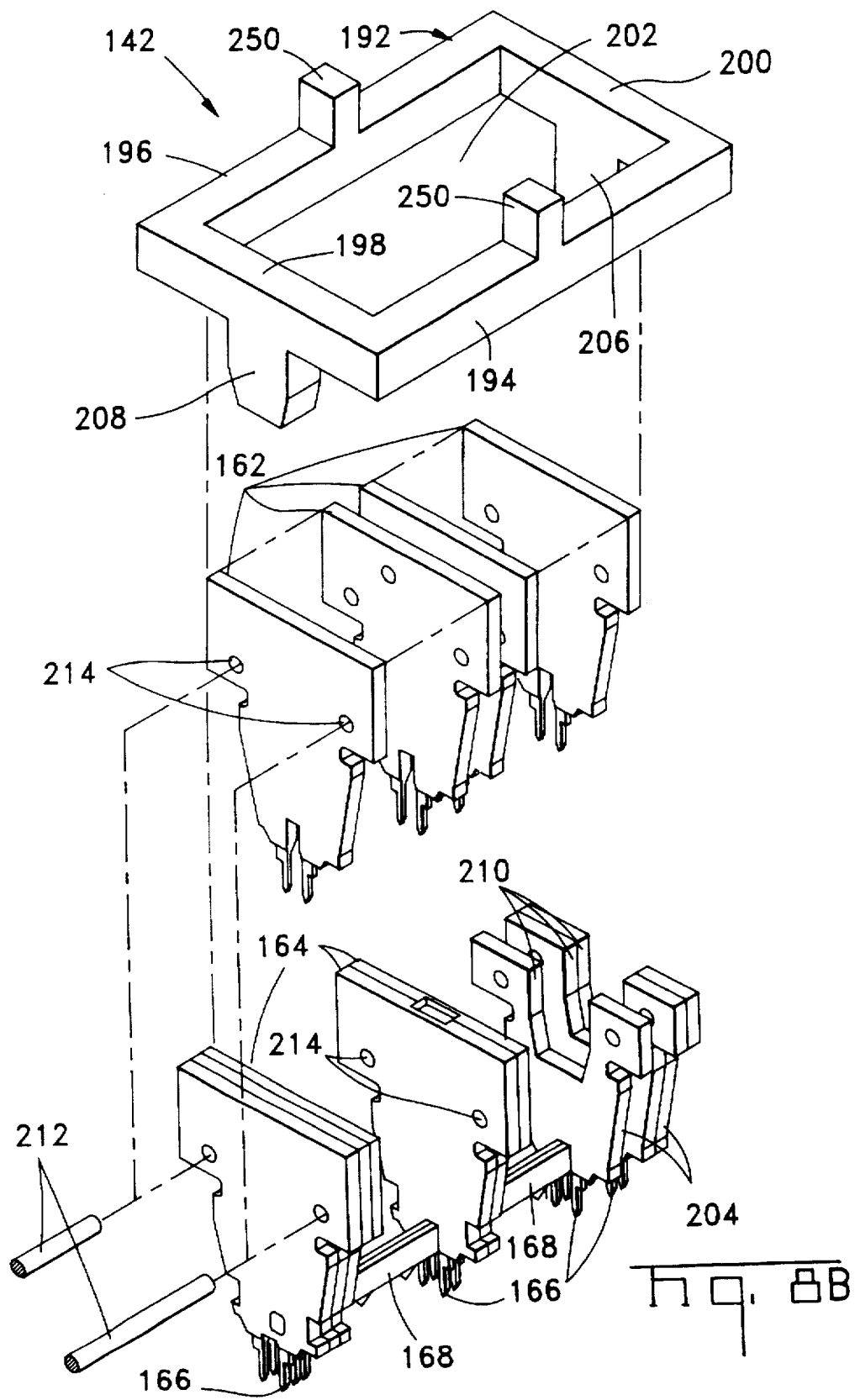

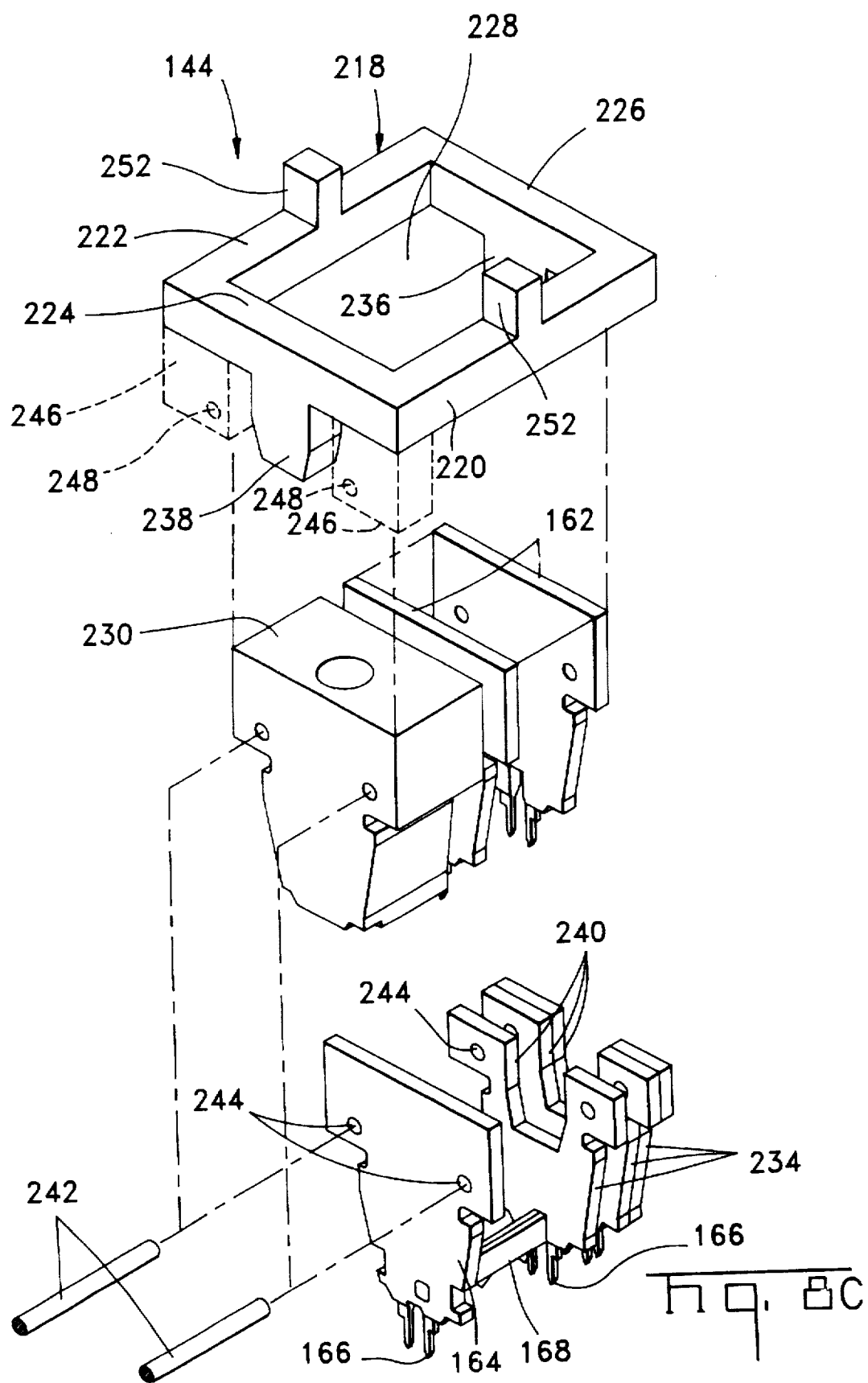

(B-SIDE BACK MOLD)

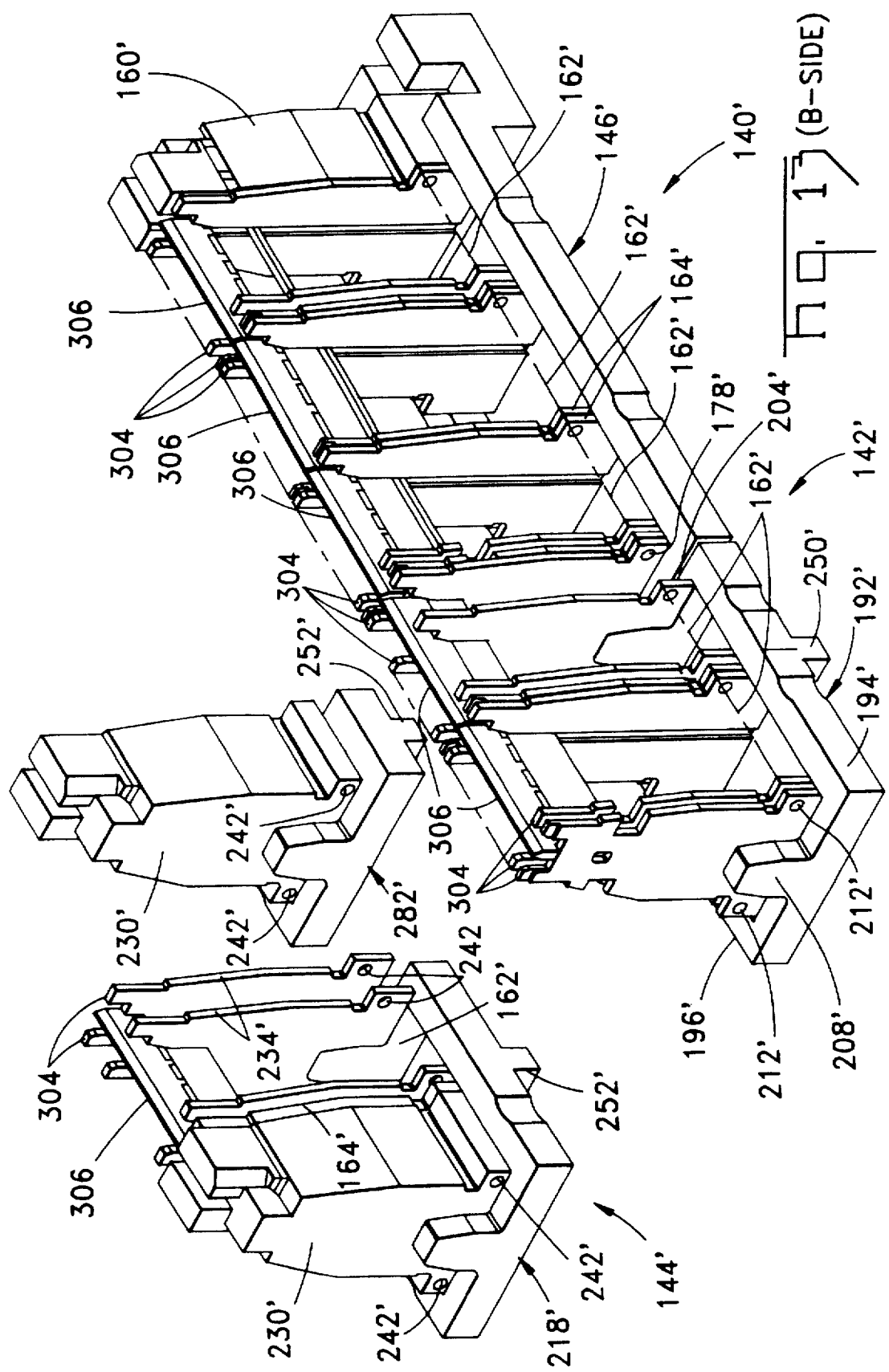

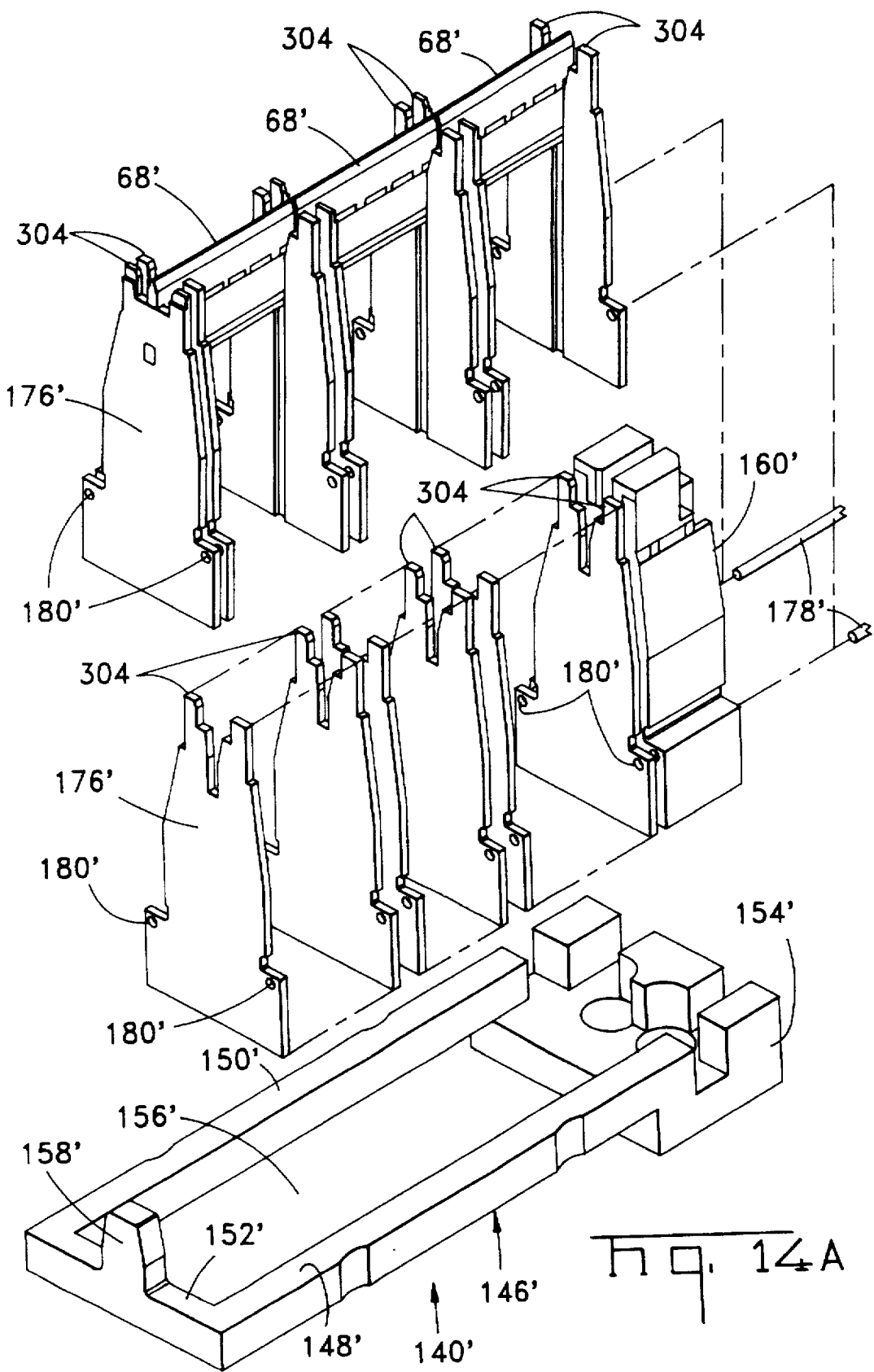

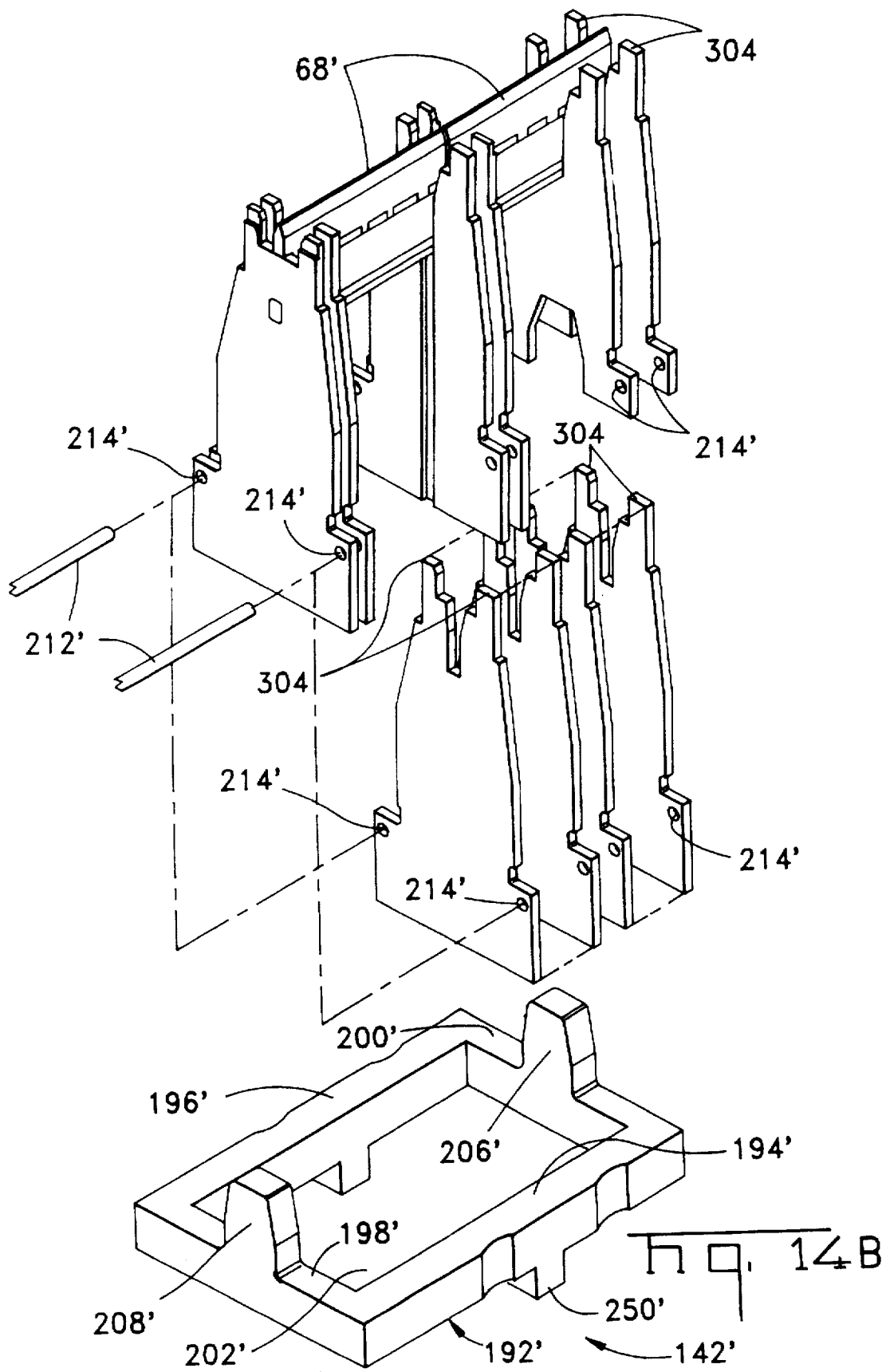

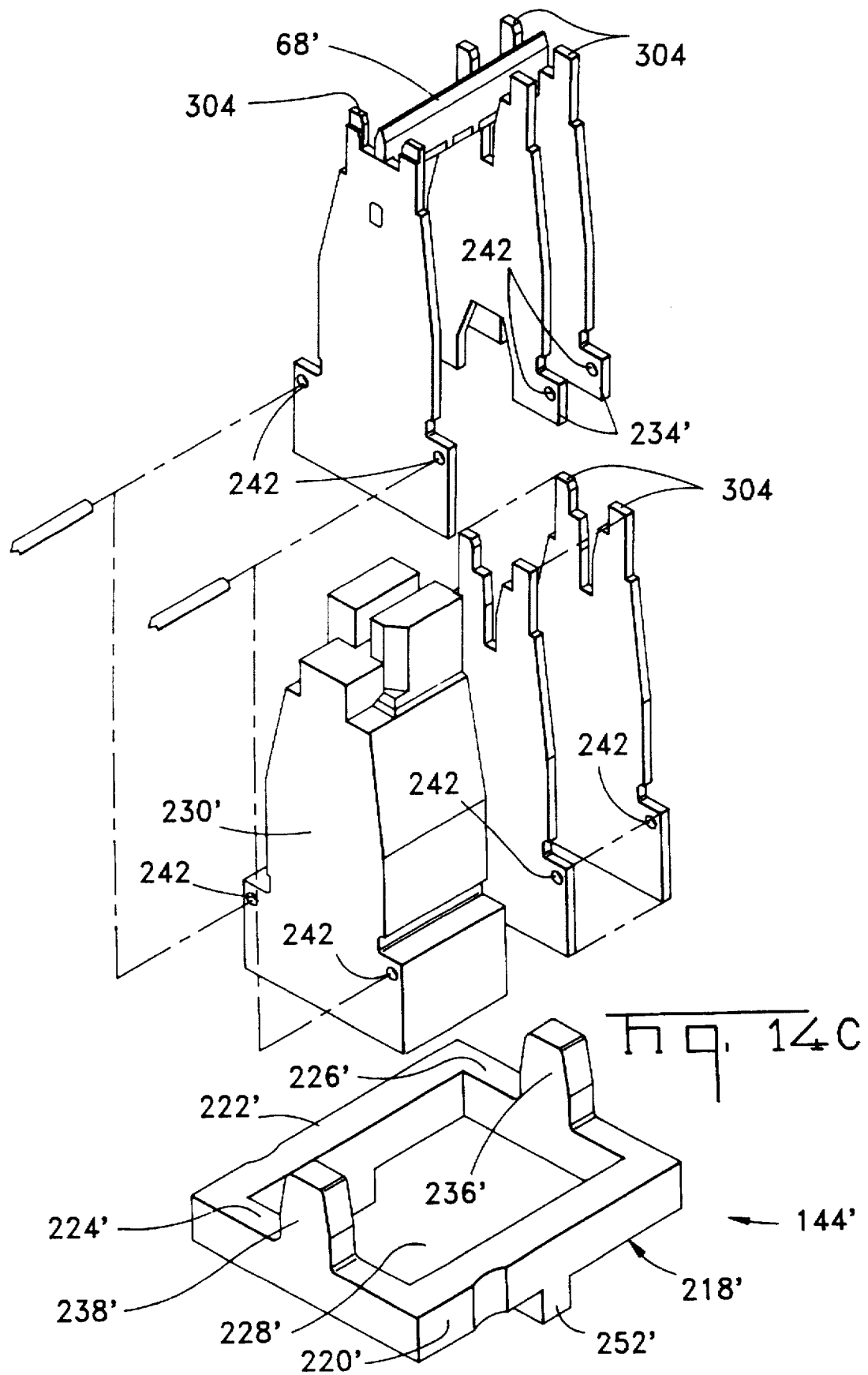

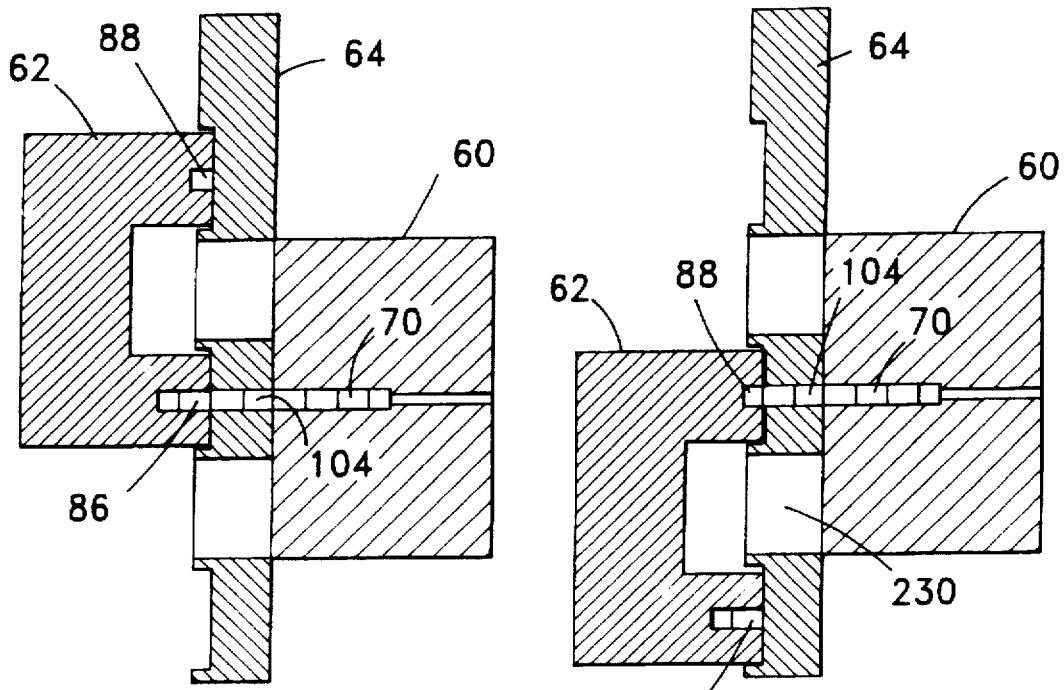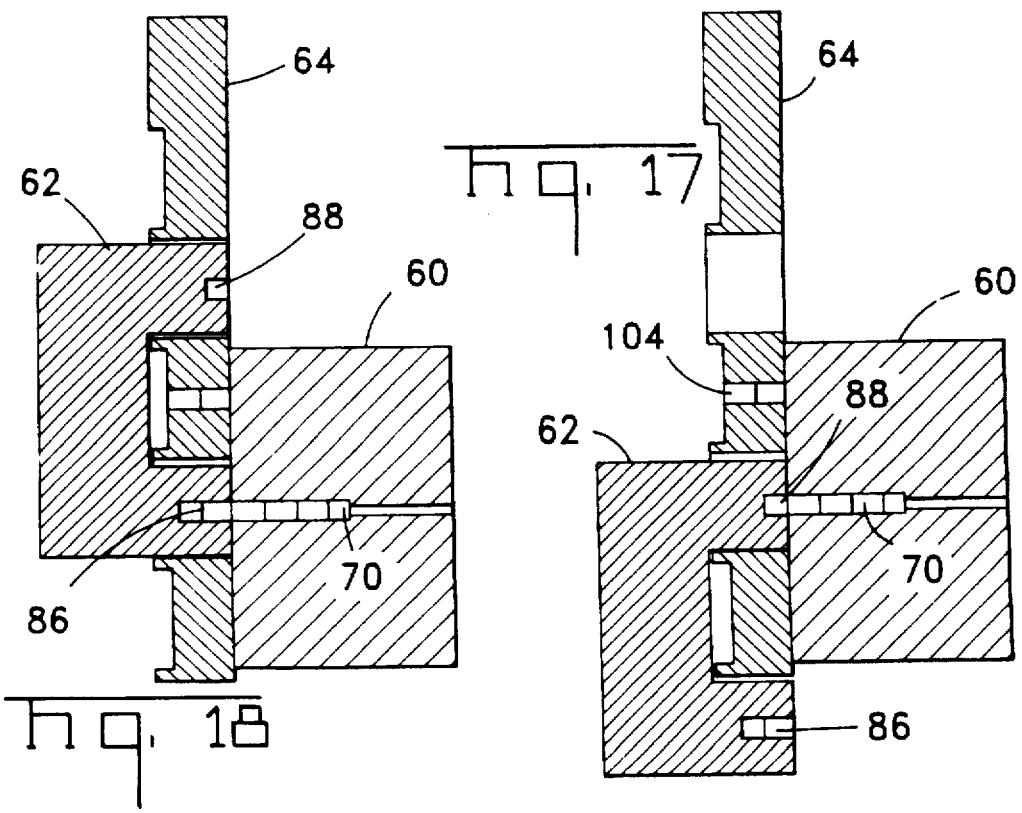

MOLD LAMINATE ASSEMBLY FOR AN INJECTION MOLD MACHINE

This application claims the benefit of U.S. Provisional Application Ser. No. 60/007,090, filed Oct. 31, 1995.

The present invention relates to injection molds having a mold cavity partly composed of several laminates stacked side by side and more particularly to an improved laminate assembly for positioning and holding the individual laminates during initial assembly and automatic reconfiguration of the mold.

BACKGROUND OF THE INVENTION

Molds for making relatively small complex injection molded parts, such as electrical connector housings, usually utilize several thin section structures, called laminates, that are stacked side by side to form a portion of the mold cavity within which the part is molded. The laminates are arranged in an array in the mold and include mold features that extend into the mold cavity to define features of the molded part which are sometimes quite intricate. When assembling the laminates to the mold they are usually stacked side by side and held tightly to eliminate any bowing or warped condition in the individual laminates and then inserted into an opening in the partially assembled mold body. This can be difficult to do because of the very small parts involved and the close quarters of the partially assembled mold. The length of the stack of laminates must be very closely controlled so that the stack fits in the mold opening with substantially no end to end play. In the case of reconfigurable molds that can be automatically reconfigured to make different molded parts, such laminates are more difficult to control. This is especially the case at the junction of one of the movable mold bodies with another mold body. Special complex structures are needed to hold the laminates together, at the junction, when the mold bodies are separated for reconfiguring.

What is needed is a laminate assembly that can be assembled on a workbench independent of the mold and then easily assembled to the mold as a subassembly Further, the laminate assembly must remain intact when adjacent mold bodies having contiguous mold cavities are separated during automatic reconfiguration.

SUMMARY OF THE INVENTION

An injection mold apparatus is disclosed for selectively molding one of a plurality of different molded parts. The mold apparatus includes a mold frame, an A-side frame coupled to the mold frame, and a B-side frame coupled to the mold frame. First and second mold bodies are provided, the first mold body having a first mold cavity therein and the second mold body having a second mold cavity therein. The second mold body is selectably movable with respect to the first mold body to a first position where the second mold cavity is in communication with the first mold cavity and to a second position where the second mold cavity is spaced from the first mold cavity. Both the first and second mold bodies are split along a part line so that each has a portion on one side of the part line coupled to the A-side frame and another portion on the other side of the part line coupled to the B-side frame. One of the A-side frame and B-side frame is a movable frame arranged to move in a direction toward the part line into a closed position wherein respective portions of the first and second mold bodies are in mutual mated engagement, and in an opposite direction away from the part line to an open position wherein the respective portions are separated. The mold apparatus includes a mold laminate assembly arranged in the second mold body comprising a plurality of mold laminates and a mounting frame. Each of the mold laminates includes a first end having mold features extending into the second mold cavity, an opposite second end having a bottom surface and left and right oppositely formed flanges adjacent opposite ends of the bottom surface, and an intermediate shank between the first and second ends. The mounting frame has an opening defined by two side walls and two end walls. The opening has a width and length for closely receiving the mounting end of a stack of all of the laminates so that the left and right flanges engage the two side walls, and there is no appreciable side to side or end play. The laminates are stacked side by side to form an array of laminates within the opening.

DESCRIPTION OF THE FIGURES

FIG. 1 is a front view of a typical mold machine incorporating the teachings of the present invention;

FIG. 2 is a block diagram showing control functions of the machine shown in FIG. 1;

FIG. 3 is a cross-sectional view taken along the lines 3—3 in FIG. 1;

FIG. 4 is an enlarged view of a portion of that of FIG. 3;

FIG. 5 is a cross-sectional view taken along the lines 5—5 in FIG. 4;

FIG. 6 is a cross-sectional view taken along the lines 6—6 in FIG. 5;

FIG. 7 is an isometric view of the A-side laminate assembly shown in FIG. 5;

FIGS. 8A, 8B, and 8C are exploded parts views of the three A-side laminate assemblies shown in FIG. 7;

FIG. 13 is an isometric view of the B-side laminate assembly shown in FIG. 11;

FIGS. 14A, 14B, and 14C are exploded parts views of the three B-side laminate assemblies shown in FIG. 13; and FIGS. 15 through 18 are schematic representations of the three mold bodies of FIG. 4 shown in various operating positions.

DESCRIPTION OF THE PREFERRED EMBODIMENT

Figure 8A:
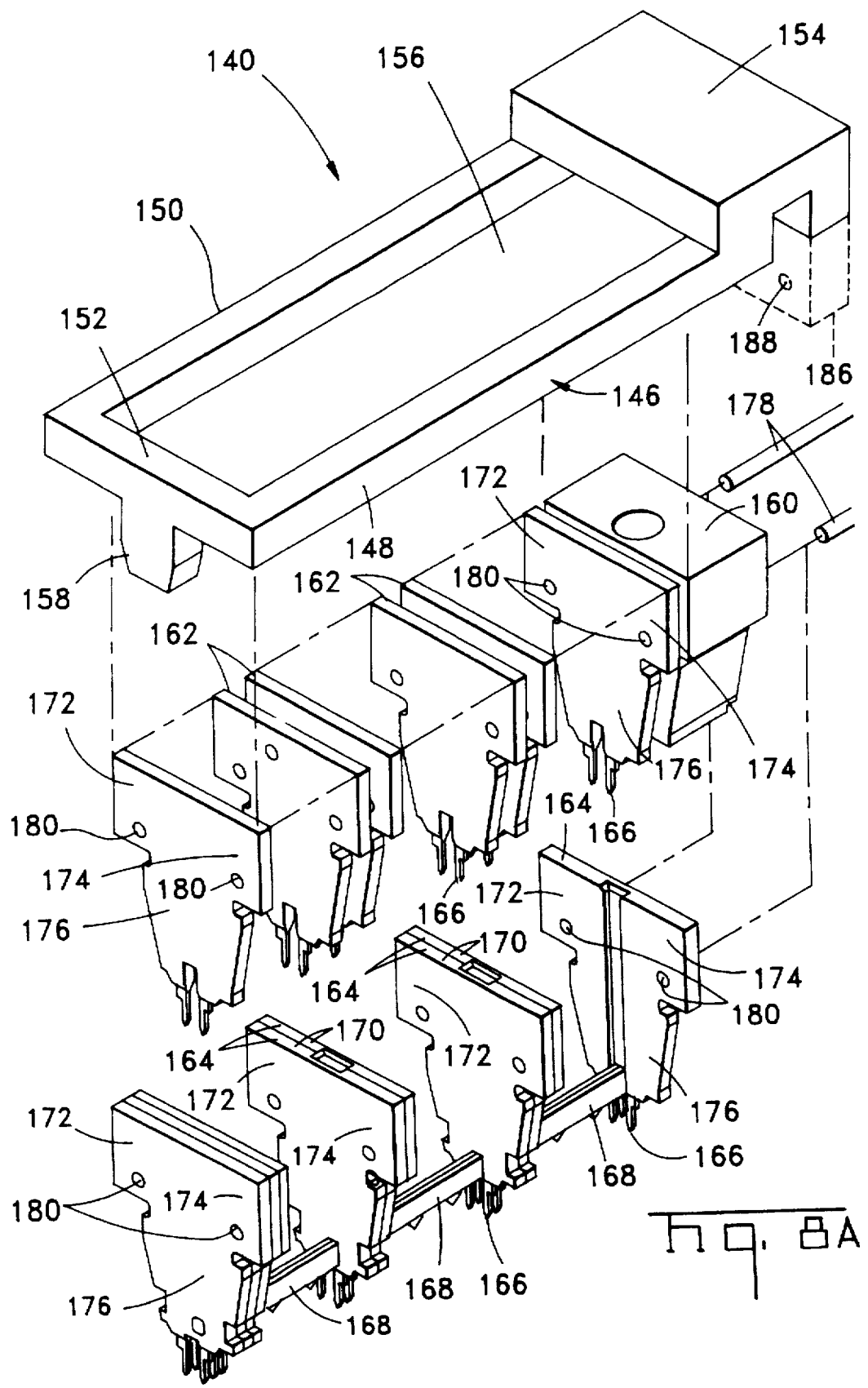

There is shown in FIG. 1 a mold machine 10 having a machine frame 12, an A-side frame 14 fixed to the machine frame, and a B-side frame 16 that is coupled to the machine frame so that it can move toward and away from the A-side frame. An A-side mold assembly 18 is attached to the A-side frame 14 and a mating B-side mold assembly 20 is attached to the B-side frame, in the usual manner. The B-side frame 16 is moved by means of a toggle clamp 22 that is hydraulic or electrical powered. A mold material injection system 24 is attached to the machine frame 12 and arranged to inject mold material into the mold cavities in the mated A-side and B-side mold assemblies, as will be explained below. The injection system 24 includes a hopper 26 for holding plastic pellets, a rotating screw 28 for feeding the pellets and the molten plastic, heater bands 30 for heating the plastic to a molten state, and a nozzle 32 that directs the molten plastic directly into the A-side mold assembly 18 and into the mold cavities of both the A-side and B-side mold assemblies when the mold is closed. A block diagram is shown in FIG. 2 showing the control functions of the mold machine 10. A press controller 42 and a frame controller 44 are interconnected to the machine 10. The press controller 42 controls various standard press functions such as opening and closing the mold, commanding the mold material injection system, and ejection of the finished molded parts, indicated in FIG. 2 as 46, 48, and 50, respectively. The frame controller 44 is interconnected to both the A-side and B-side mold assemblies 18 and 20, respectively, and controls movement of the movable mold bodies when reconfiguring the mold, as will be explained below. An input/output terminal 52 is optionally interconnected with the press and frame controllers 42 and 44 so that an operator can manually enter mold configuration commands.

The A-side mold assembly 18, as shown in FIGS. 3 and 4, includes first, second and third mold bodies 60, 64, and 62, respectively. The first mold body 60 is rigidly attached to a platen 66 that serves as a base for the A-side mold assembly 18. The third and second mold bodies 62 and 64 are slidingly coupled to the platen 66, as will be explained. As best seen in FIG. 4, the first mold body 60 includes a first surface 68 and a first mold cavity 70 that intersects the surface 68. The nozzle 32 enters the center of the first mold body and terminates in a sprue 72 which is in communication with the mold cavity 70 by means of a runner 74 and tunnel gate 76, in the usual manner.

The third mold body 62 includes a second surface 78 that is parallel to the first surface 68 and opposed thereto, as shown in FIG. 4. A cutout 80 is formed in the second surface 78 thereby forming two legs 82 and 84. The leg 82 includes a second mold cavity 86 and the leg 84 includes a third mold cavity 88, each of which intersects the second surface 78. The third mold body 62 is slidingly coupled to the platen 66 by any suitable means so that it is free to move both horizontally and vertically, as viewed in FIGS. 3 and 4. A first linear actuator 90, which in the present example is an air cylinder, is attached to the platen 66 and is slidingly coupled to the third mold body 62 so that upon operation of the actuator 90, the third mold body is made to move in either direction along a horizontal path, as viewed in FIG. 3. A pair of opposing second and third linear actuators 92 and 94, which are air cylinders in the present example, are secured to mounting brackets 96 and 98 that are attached to the platen 66. The piston rods of the two actuators 92 and 94 are coupled to opposite sides of the third mold body 62 through two slide bars 61 and 63 which abut against the third mold body 62 so that the third mold body can be made to move in either direction along a vertical path, as viewed in FIG. 3.

The second mold body 64 includes third and fourth parallel surfaces 100 and 102, respectively. A fourth mold cavity 104 extends through the second mold body 64 intersecting the two surfaces 100 and 102. The second mold body 64 is slidingly coupled to the platen 66 by any suitable means so that it is free to move both horizontally and vertically, as viewed in FIGS. 3 and 4. Fourth and fifth linear actuators 106 and 108, which in the present example are air cylinders, are attached to the platen 66 and are coupled through a pivoting linkage, not shown, to the second mold body 64 so that upon operation of the actuators, the second mold body 64 is made to move toward the right, as viewed in FIG. 3, toward the first actuator 90. A pair of opposing sixth and seventh linear actuators 110 and 112, which are air cylinders in the present example, are secured to mounting brackets 96 and 98. The piston rods of the two actuators 110 and 112 are slidingly coupled to opposite sides of the second mold body 64 so that by varying the relative pressure in the two actuators, the second mold body can be made to move in either direction along a vertical path, as viewed in FIG. 3, and parallel to the first surface 68. The second mold body 64 includes two openings 114 and 116 that extend completely through the body 64 intersecting the third and fourth surfaces 100 and 102, for a purpose that will be explained.

There is shown in FIG. 5 an array of three contiguous laminate assemblies, a first laminate assembly 140, a second laminate assembly 142, and a third laminate assembly 144, which are associated with the first, second, and third mold bodies 60, 64, and 62, respectively, of the A-side mold assembly 18. Each of the laminate assemblies, as shown in FIGS. 6, 7, 8A, 8B, and 8C, includes a rectangular shaped mounting frame and a series of laminates that fit into the mounting frame.

The laminate assembly 140, as best seen in FIG. 8A, includes a mounting frame 146 having a pair of opposite side rails 148 and 150, and a pair of end rails 152 and 154. The side and end rails form a closed, encircled opening 156 that is sized to closely receive an end block 160 and a series of laminates 162 that are arranged in three groups, indicated by dashed lines, and end laminates 164 that are arranged on opposite sides of each of the groups of laminates 162, as best seen in FIG. 8A. The three groups of laminates will mold three contact modules of a single connector housing and the end block 160 will mold an end module on one end of the connector housing. Each of the laminates 162 and 164 has a first end with mold features 166 formed thereon that extend into the first mold cavity 70. The two end laminates 164 of each group support the two ends of a bridge 168, each group having a separate bridge. A portion of each of the three bridges 168 extends into the first mold cavity 70 to provide additional mold features. Each of the laminates 162 and 164 includes a bottom surface 170 opposite its first end and left and right oppositely formed flanges 172 and 174 adjacent opposite ends of the bottom surface, and an intermediate shank 176 between the bottom surface and first end. When all of the laminates 162 and 164, and the end block 160 are arranged side by side in a stack, a pair of guide pins 178 are inserted through holes 180 formed in the flanges 172 and 174 of all of the laminates and the end block. The stack is then inserted into the opening 156 of the mounting frame 146 with substantially no lateral play between the flanges of the laminates and the side rails 148 and 150 and substantially no end play between the laminates and the end rails 152 and 154. The guide pins serve to align the laminates with respect to each other and to hold them together within the mounting frame 146. The mounting frame 146 includes a support 158 that extends downwardly from the end rail 152, as shown in FIG. 8A, for providing lateral support to the laminates during assembly thereof and to push the laminates together with a portion of the clamping force provided by the injection molding machine as the mold is closed. Usually, friction between the laminates and the end rails 152 and 154 is sufficient to hold the stack within the opening 156 during normal handling during the assembly process. However, the end rail 154 may include a downwardly extending portion 186, shown in phantom lines in FIG. 8, having a pair of holes 188 into which the ends of the guide pins 178 extend, for positively holding the laminates captive within the mounting frame 146.

The laminate assembly 142, as best seen in FIG. 8B, includes a mounting frame 192 having a pair of opposite side rails 194 and 196, and a pair of end rails 198 and 200. The side and end rails form a closed, encircled opening 202 that is sized to closely receive a series of laminates 162 that are arranged in two groups, indicated by dashed lines, and end laminates 164 and 204 that are arranged on opposite sides of the groups of laminates 162. The two groups of laminates will mold two contact modules of a connector housing without end modules. The mounting frame 192 includes a support 206 that extends downwardly from the end rail 200, and a support 208 that extends downwardly from the end rail 198, as shown in FIG. 8B, for providing lateral support to the laminates during assembly thereof. Each of the end laminates 204 includes a cutout 210 that receives one of the supports 158 and 206 when the two laminate assemblies 140 and 142 are arranged with their end rails 152 and 200 in engagement, as shown in FIG. 7. This arrangement allows the two stacks of laminates in the two assemblies to be contiguous, that is, the end laminate 164 of the assembly 140 is in engagement with the end laminate 204 of the assembly 142. The mold features 166 of each of the laminates 162, 164, and 204 of the laminate assembly 142 extend into the fourth mold cavity 104. The two end laminates of each group support the two ends of a bridge 168, each of the two groups having a separate bridge in a manner similar to that of the laminate assembly 140. A portion of each of the two bridges 168 extends into the fourth mold cavity 104 to provide additional mold features. When all of the laminates 162, 164, and 204 are arranged side by side in a stack, a pair of guide pins 212 are inserted through holes 214 formed in the flanges 172 and 174 of all of the laminates 162 and 164 of the assembly 142. The stack is then inserted into the opening 202 of the mounting frame 192 with substantially no lateral play between the flanges of the laminates and the side rails 194 and 196 and substantially no end play between the laminates and the end rails 198 and 200, in a manner similar to that of the laminate assembly 140. The guide pins serve to align the laminates with respect to each other and to hold them together within the mounting frame 192.

Similarly, the laminate assembly 144, as best seen in FIG. 8C, includes a mounting frame 218 having a pair of opposite side rails 220 and 222, and a pair of end rails 224 and 226. The side and end rails form a closed, encircled opening 228 that is sized to closely receive an end block 230 and a series of laminates 162 that are arranged in one group, indicated by dashed lines, and end laminates 164 and 234 that are arranged on opposite sides of the group of laminates 162. The single group of laminates will mold one contact module of a connector housing and the end block 160 will mold an end module on one end of the connector housing. The mounting frame 218 includes a support 236 that extends downwardly from the end rail 226, and a support 238 that extends downwardly from the end rail 224, as shown in FIG. 8C, for providing lateral support to the laminates during assembly thereof. Each of the end laminates 234 includes a cutout 240 that receives one of the supports 238 and 208 when the two laminate assemblies 142 and 144 are arranged with their end rails 198 and 226 in engagement, as shown in FIG. 7. This arrangement allows the two stacks of laminates in the two assemblies to be contiguous, that is, the end laminate 164 of the assembly 142 is in engagement with the end laminate 234 of the assembly 144. The mold features 166 of each of the laminates 162, 164, and 234 of the laminate assembly 142 extend into the third mold cavity 88. The two end laminates 164 and 234 of the group support the two ends of a bridge 168 in a manner similar to that of the laminate assembly 140. A portion of the bridge 168 extends into the third mold cavity 88 to provide additional mold features. When all of the laminates 162, 164, and 234 and the end block 230 are arranged side by side in a stack, a pair of guide pins 242 are inserted through holes 244 formed in the flanges 172 and 174 of all of the laminates and the end block of the assembly 144. The stack is then inserted into the opening 228 of the mounting frame 146 with substantially no lateral play between the flanges of the laminates and the side rails 220 and 222 and substantially no end play between the laminates and the end rails 224 and 226, in a manner similar to that of the laminate assembly 140.

The guide pins serve to align the laminates with respect to each other and to hold them together within the mounting frame 218. Usually, friction between the laminates and the end rails 224 and 226 is sufficient to hold the stack within the opening 228 during normal handling during the assembly process. However, the end rail 224 may include a downwardly extending portion 246, shown in phantom lines in FIG. 8C, having a pair of holes 248 into which the ends of the guide pins 242 extend, for positively holding the laminates captive within the mounting frame 218.

The two mounting frames 192 and 218 include pairs of mounting lugs 250 and 252, respectively, extending from their side rails in a direction opposite that of the supports 208 and 236, as best seen in FIGS. 8B and 8C. These mounting lugs 250 and 252 are used to secure the laminate assemblies 142 and 144 in their respective mold bodies 64 and 62, as shown in FIG. 5. The mold body 64 includes a cutout 254 having a shoulder 256 against which the mounting lugs 250 are secured by means of a clamp 258. A screw 260 is threaded into a hole in the mold body 64 to force the clamp against the mounting lugs 250, as shown in FIG. 5. Left and right mold pieces 262 and 264 of the mold body 64 include tapered surfaces 266 and 268, respectively, that engage similar tapered surfaces 270 and 272 on opposite sides of the shanks 176 of all of the laminated 162, 164, and 204 of the laminate assembly 142 and precisely align them with respect to the mold cavity 104 and secure them in the mold body 64, as best seen in FIG. 6. Similarly, the mold body 62 includes a cutout 274 having a shoulder 276 against which the mounting lugs 252 of the mounting frame 218 are secured by means of a clamp 258 and screw 260, as shown in FIG. 5. Additionally, left and right mold pieces 278 and 280 of the mold body 62 are arranged to engage the tapered surfaces of the laminates 162, 164, 234, and the end block 230, for alignment and to secure them in the mold body 64, in a manner similar to that of the mold pieces 262 and 264. As shown in FIG. 4, the mold body 62 includes a mold cavity 86 in addition to the mold cavity 88 which includes a mounting frame 282 similar to the mounting frame 218, however, containing only an end block 230 without laminates, as best seen in FIG. 7. This mold cavity 86 is used in conjunction with a mating mold cavity, as will be described below, to form an end module onto the connector housing being molded.

The end rail 154 of the mounting frame 146 includes a shoulder 288 that engages a shoulder 290 formed in the mold body 60, as best seen in FIG. 5. Left and right mold pieces 292 and 294 of the mold body 60 are arranged to engage the tapered surfaces of the laminates 162, 164, and the end block 160, for alignment and to secure them in the mold body 60, in a manner similar to that of the mold pieces 262 and 264. However, unlike the mold bodies 62 and 64, there is no clamp 258 to hold the shoulder 288 of the end rail 154 against the shoulder 290. Instead, the mold pieces 292 and 294 include portions 296 that extend adjacent the end surface 298 of the end rail 154 and confine the rail between the portions 296 and the shoulder 290 without play.

With this arrangement the mold bodies 60, 62, and 64 can be separated during the course of automatically reconfiguring the mold without the end laminates of the three laminate assemblies 140, 142, and 144 falling out of position or becoming dislodged in any way.

Figure 9:
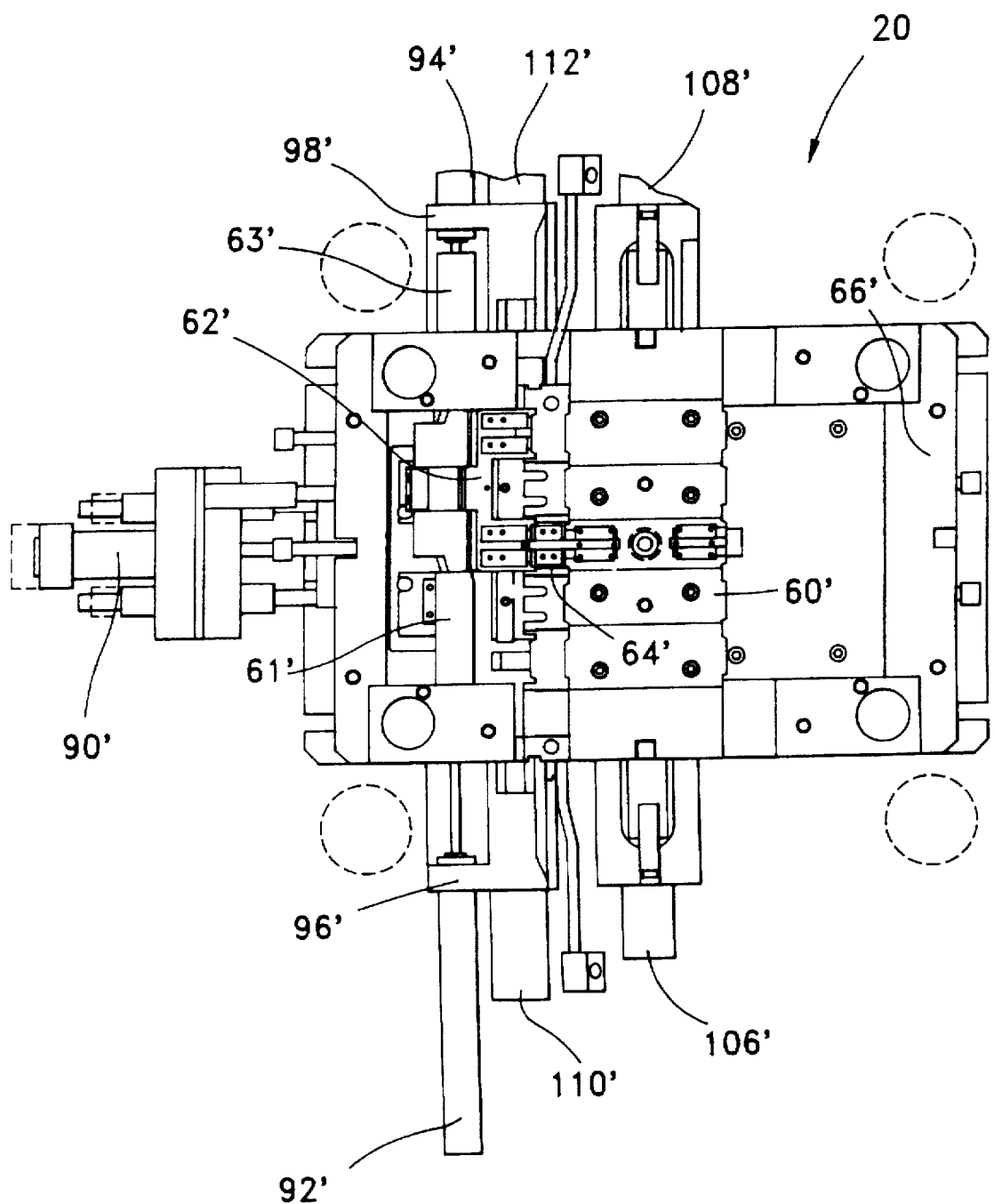
FIG. 9 is a cross-sectional view taken along the lines 9—9 in FIG. 1.
Figure 10:
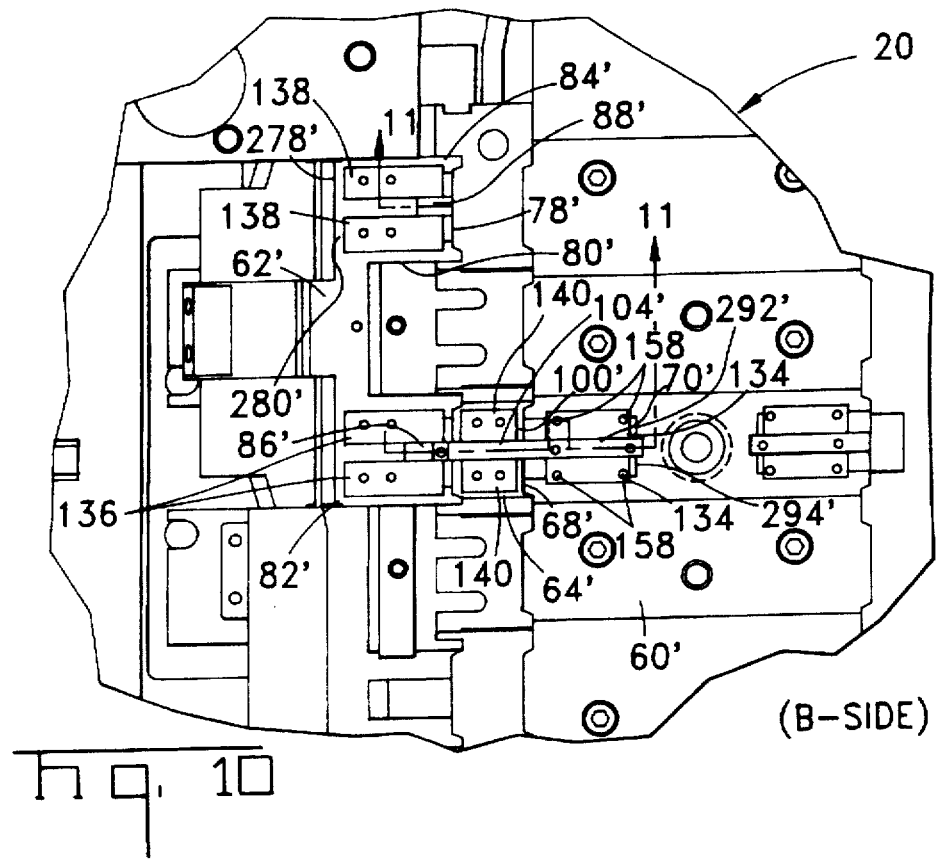
FIG. 10 is an enlarged view of a portion of that of FIG. 9.
Figure 11:
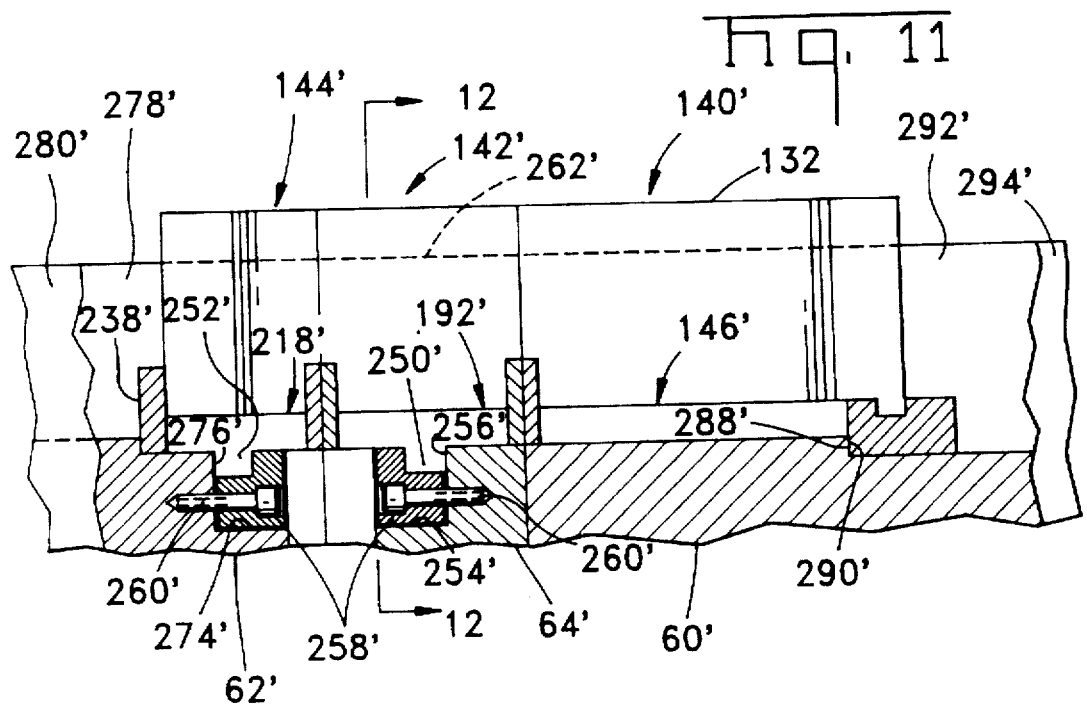
FIG. 11 is a cross-sectional view taken along the lines 11—11 in FIG. 10.
Figure 12:
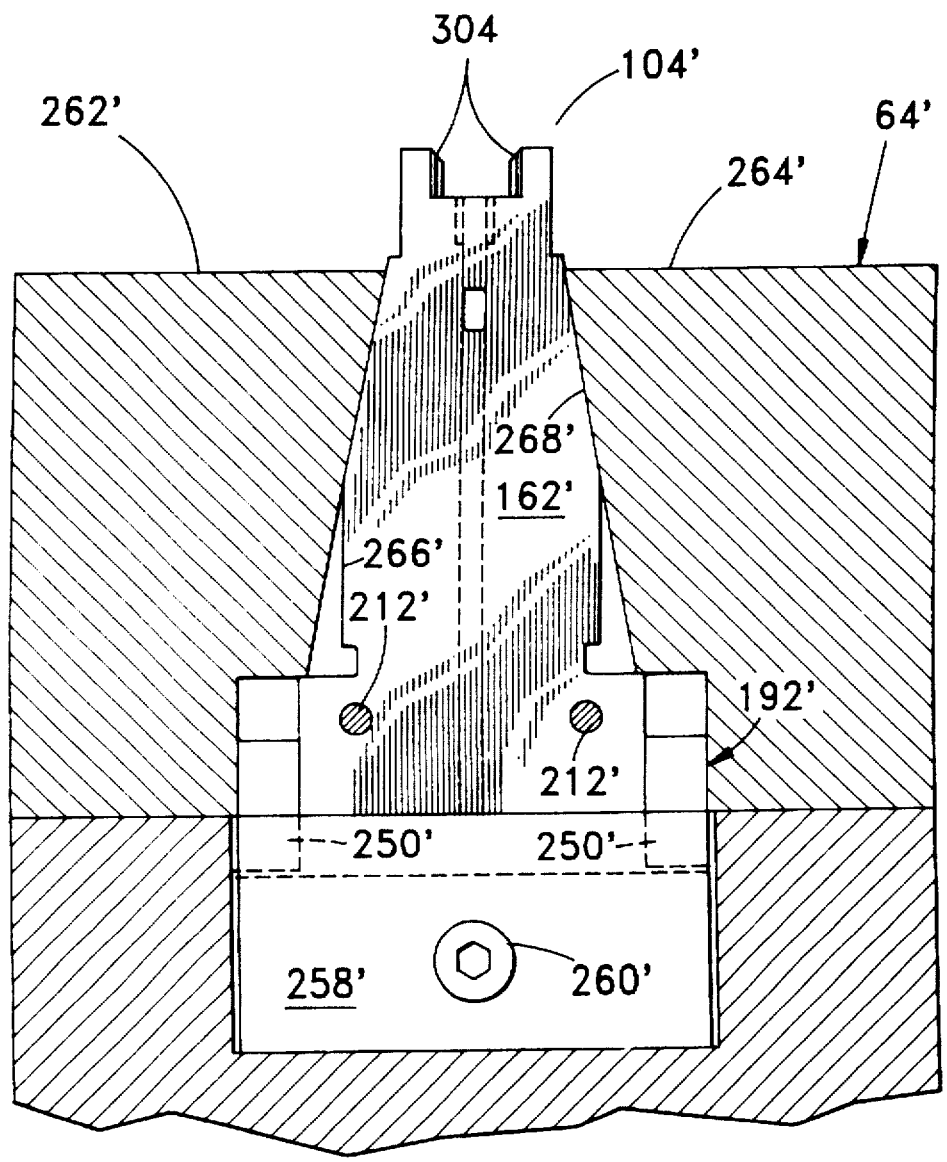
FIG. 12 is a cross-sectional view taken along the lines 12—12 in FIG. 11.

The B-side mold assembly 20, as viewed in FIGS. 9 and 10, have first, second and third mold bodies that mate with the first, second and third mold bodies 60, 64, and 62 of the A-side assembly 18, and have similar identifying part numbers that are primed. That is, the first, second and third mold bodies of the B-side are identified by the part numbers 60', 64', and 62', respectively. Additionally, other features of the B-side mold assembly that have substantially similar corresponding features on the A-side will be identified with a primed version of the A-side part number, even though the corresponding features may be somewhat different. As shown in FIGS. 11, 12, 13, and 14. The mold bodies 60', 64', and 62' include laminate assemblies 140', 142', and 144', respectively, that are similar in structure to and mate with the laminate assemblies 140, 142, and 144 when the mold is closed for molding a connector housing. As is shown in FIGS. 13, 14A, 14B, and 14C, the laminate assemblies 140' 142' and 144' include respective side rails 148', 150', 194', 196', 220', 222' and end rails 152', 154', 198', 200', 224', 226' that encircle respective openings 156', 202', 228'. Included are respective supports 158', 206', 208', 236', 238' and mounting lugs 250' and 252'. Laminates 162' and end laminates 164', 204', 234' are arranged in three groups along with an end block 160' to be received in the opening 156', as shown in FIG. 14A, two groups to be received in the opening 202', as shown in FIG. 14B, and in a single group along with an end block 230' to be received in the opening 228', as shown in FIG. 14C, in a manner similar to their counterparts in the laminate assemblies 140, 142, and 144. As shown in FIG. 10, the mold body 62' includes a mold cavity 86' in addition to the mold cavity 88' which includes a mounting frame 282' similar to the mounting frame 218', however, containing only an end block 230' without laminates, as best seen in FIG. 13. This mold cavity 86' is used in conjunction with the mold cavity 86 to form an end module onto the connector housing being molded. The two end laminates 164 of each group support the two ends of a bridge 306, each group having a separate bridge. A portion of each of the three bridges 306 of the laminate assembly 140' extends into the first mold cavity 70', while portions of the bridges 306 of the laminate assemblies 142' and 144' extend into respective mold cavities 104' and 88', to provide additional mold features in these mold cavities. Note, it will be understood that the mold cavities 70', 86', 88', and 104' are actually mold volumes that surround and include the mold features 304 and project into respective mold cavities 70, 86, 88, and 104. However, these mold volumes will be referred to herein as mold cavities. In addition to the bridges 306 possibly having a different shape than the bridges 168, the mold features 304 of the laminates in the laminate assemblies 140', 142', and 144' may have a different shape than the mold features 166 in the laminate assemblies 140, 142, and 144.

The third and second mold bodies 62' and 64' are arranged to move both horizontally and vertically, as viewed in FIG. 9, in a manner similar to the mold bodies 62 and 64, by means of first, second, third, fourth, fifth, sixth, and seventh actuators 90', 92', 94', 106', 108', 110', and 112', respectively. The outer surfaces of the A-side mold bodies 60, 62, and 64 are mutually coplanar and are collectively identified by the number 130 in FIG. 1, this collective surface being the parting line of the mold. The opposing surfaces of the B-side mold bodies 60', 62', and 64' are also mutually coplanar and parallel with the surface 130 and are collectively identified by the number 132 in FIG. 1. The collective surfaces 130 and 132 form a part line and are in sealing mated engagement during the actual molding process.

The following is a brief discussion of the operation of the automatic reconfiguring of the mold machine 10, with reference to FIGS. 15 through 18 which schematically depict the various mold bodies of the A-side only. It will be understood that when an A-side mold body is moved in actual operation, so is the corresponding B-side mold body. As shown in FIG. 15 the mold cavities 70, 104, and 86 are in mated engagement for molding a first part by operating the injection system 24. When it is desired to mold a second part utilizing the mold cavities 70, 104, and 88, the third mold body must be moved to the position shown in FIG. 16. This is done by first opening the mold by operating the toggle clamp 22 and then operating the first actuator 90 to move the third mold body 62 away from the second mold body 64 The second and third actuators 92 and 94 are operated to move the third mold body 62 downwardly, as viewed in FIG. 16, so that the mold cavity 88 is in proper alignment with the mold cavity 104. The first actuator 90 is then operated to move the third mold body 62 into mated engagement with the second mold body 64. The toggle clamp 22 is then operated to close the mold and the injection system 24 operated to inject molten plastic into the mated mold cavities. When it is desired to mold a third part utilizing the mold cavities 70 and 88, the third and second mold bodies 62 and 64 must be moved to the position shown in FIG. 17. This is done by first opening the mold by operating the toggle clamp 22 and then operating the first actuator 90 to move the third mold body 62 away from the second mold body 64. The fourth and fifth actuators 106 and 108 are operated to move the second mold body 64 to the left, as viewed in FIG. 16, out of engagement with the first mold body 60 and then the sixth and seventh actuators 110 and 112 are operated to move the second mold body upwardly so the opening 230, shown in FIG. 16, is in centered alignment with first mold cavity 70. The first actuator 90 is then operated to move the second mold body 64 to the right, as viewed in FIG. 17, and the third mold body 62 into mated engagement with the first mold body 60, to the position shown in FIG. 17, with the mold cavities 70 and 88 in mated engagement. When it is desired to mold a fourth part utilizing the mold cavities 70 and 86, the third mold body 62 must be moved to the position shown in FIG. 18. This is done by first opening the mold by operating the toggle clamp 22 and then operating the first actuator 90 to move the third mold body 62 away from the second mold body 64. The second and third actuators 92 and 94 are then operated to move the third mold body 62 upwardly, as viewed in FIG. 17 until the second mold cavity 86 is in alignment with the first mold cavity 70. The first actuator 90 is then operated to move the third mold body 62 into mated engagement with the first mold body 60, to the position shown in FIG. 18, with the mold cavities 70 and 86 in mated engagement for molding a fourth part.

While three mold bodies and three laminate assemblies are disclosed herein, two of which are movable, any number of mold bodies, including a single mold body, may be advantageously utilized in the practice of the present invention. Additionally, a single laminate assembly may be utilized in combination with one or more mold bodies, or more than one laminate assembly may be used therewith, independent of whether the mold bodies are movable or reconfigurable.

An important advantage of the present invention is that the laminate assembly can be assembled on a workbench independent of the mold and then easily assembled to the mold as a subassembly Further, the laminate assembly remains intact when adjacent mold bodies having contiguous mold cavities are separated during automatic reconfiguration.

We claim:

1. A mold laminate assembly for use in an injection mold for producing a molded part comprising:

(a) a plurality of mold laminates each of which includes a first end having mold features, an opposite second end, and an intermediate shank between said first and second ends; and (b) a mounting frame having an opening defined by two side walls and two end walls, said opening having a width for closely receiving said second end of each of said laminates with no appreciable lateral play, and said opening having a length for closely receiving said second ends of said plurality of laminates with no appreciable end to end play, said laminates being stacked side by side to form an array of laminates within said opening, wherein said mold laminate assembly is adapted to be received within a mold body of an injection mold.

2. The mold laminate assembly according to claim 1 wherein said mounting frame completely encircles said opening.

3. The mold laminate assembly according to claim 1 wherein said mounting frame comprises two oppositely disposed side rails, a first end rail attached to one end of each of said two side rails, and a second end rail attached to the other end of each of said two side rails thereby forming a continuous structure completely surrounding said opening.

4. The mold laminate assembly according to claim 3 wherein said mounting frame includes a projection extending from one side thereof and adapted to engage said mold body for positioning said mold laminate assembly therewithin.

5. The mold laminate assembly according to claim 4 where said mounting frame includes a flange extending from said first end rail and arranged to engage one of said plurality of laminates and urge said plurality of laminates into square alignment with respect to said two side rails of said mounting frame.

6. The mold laminate assembly according to claim 1 wherein each of said plurality of laminates includes a bottom surface and left and right oppositely formed flanges adjacent opposite ends of said bottom surface and a hole formed through each of said left and right flanges, and including a pair of pins, one said pin extending through said holes of at least two of said right flanges and the other said pin extending through said holes of at least two of said left flanges, said pair of pins serving to maintain said plurality of laminates in mutual alignment within said opening of said mounting frame.

7. The mold laminate assembly according to claim 6 wherein one of said pair of pins extends into a hole in said mounting frame thereby holding said plurality of laminates captive to said mounting frame.

8. The mold laminate assembly according to claim 1 wherein said shank of each of said laminates includes locating surfaces for engaging said mold body for precisely aligning said laminate within said mold body.

9. The mold laminate assembly according to claim 1 including a bridge disposed in engagement with said first end of each of said plurality of laminates, said bridge having mold features thereon that cooperate with said mold features of said plurality of laminates in the molding of said molded part.

10. In an injection mold apparatus for selectively molding one of a plurality of different molded parts, including: a mold frame, an A-side frame coupled to said mold frame, and a B-side frame coupled to said mold frame; a first mold body having a first mold cavity therein, and a second mold body having a second mold cavity therein, said second mold body being selectably movable with respect to said first mold body to a first position where said second mold cavity is in communication with said first mold cavity and to a second position where said second mold cavity is spaced from said first mold cavity, both said first and second mold bodies being split along a part line so that each has a portion on one side of said part line coupled to said A-side frame and another portion on the other side of said part line coupled to said B-side frame, one of said A-side frame and B-side frame being a movable frame arranged to move in a direction toward said part line into a closed position wherein respective portions of said first and second mold bodies are in mutual mated engagement, and in an opposite direction away from said part line to an open position wherein said respective portions are separated, a mold laminate assembly arranged in said second mold body comprising:

(a) a plurality of mold laminates each of which includes a first end having mold features extending into said second mold cavity, an opposite second end, and an intermediate shank between said first and second ends; and (b) a mounting frame having an opening defined by two side walls and two end walls, said opening having a width for closely receiving said second end of each of said laminates with no appreciable lateral play, and said opening having a length for closely receiving said second ends of said plurality of laminates with no appreciable end to end play, said laminates being stacked side by side to form an array of laminates within said opening.

11. The apparatus according to claim 10 wherein said mounting frame completely encircles said opening.

12. The apparatus according to claim 10 wherein said mounting frame comprises two oppositely disposed side rails, a first end rail attached to one end of each of said two side rails, and a second end rail attached to the other end of each of said two side rails thereby forming a continuous structure completely surrounding said opening.

13. The apparatus according to claim 12 wherein said mounting frame includes a projection extending from one side thereof and adapted to engage said second mold body for positioning said mold laminate assembly therewithin.

14. The apparatus according to claim 10 wherein each said mold laminate includes a bottom surface and left and right oppositely formed flanges adjacent opposite ends of said bottom surface, a hole formed through each of said left and right flanges, and including a pair of pins, one said pin extending through said holes of at least two of said right flanges and the other said pin extending through said holes of at least two of said left flanges, said pair of pins serving to maintain said plurality of laminates in mutual alignment within said opening of said mounting frame.

15. The apparatus according to claim 14 wherein one of said pair of pins extends into a hole in said mounting frame thereby holding said plurality of laminates captive to said mounting frame.

16. The apparatus according to claim 10 wherein said shank of each of said laminates includes locating surfaces for engaging said second mold body for precisely aligning said mold features of said laminate within said second mold cavity.

17. The apparatus according to claim 10 including a bridge disposed in engagement with said first end of each of said plurality of laminates, said bridge having mold features thereon that cooperate with said mold features of said plurality of laminates in the molding of said molded part.

* * * * *